July 27, 1943.  F. B. HARMON  2,325,130

MEASURING DEVICE

Filed May 23, 1941

INVENTOR
Frank B. Harmon
BY Charles H. Brown
ATTORNEY

Patented July 27, 1943

2,325,130

UNITED STATES PATENT OFFICE 2,325,130

MEASURING DEVICE

Frank B. Harmon, Clifton, N. J., assignor of one-half to Irving M. Blum, Hewlett, N. Y.

Application May 23, 1941, Serial No. 394,746

5 Claims. (Cl. 33—141)

This invention relates to improvements in portable measuring devices for obtaining linear measurements.

A primary object of the invention is to provide a simplified and inexpensive device for measuring distances that is particularly applicable for taking horizontal and vertical measurements.

Another object is to provide a device for taking linear measurements which is reliable and efficient in use, made of a few simple parts, and which is so compact that it can be easily placed in a pocket or handbag when not in use.

A further object is to provide a measuring device which can furnish both an audible signal and a visible indication of the distance being measured.

A feature of the invention comprises the socket which enables a folding pocket ruler or other suitable strip of material to detachably engage therewith for convenient use as a handle for the measuring device.

Another feature is the pin arrangement which is movable in a slot for operative association with or disassociation from a flexible noise producing element, in order to provide an audible click for a predetermined unit of measurement.

Other objects and features, and their advantages, will appear from a reading of the following description which is accompanied by a drawing, wherein.

Figure 1:
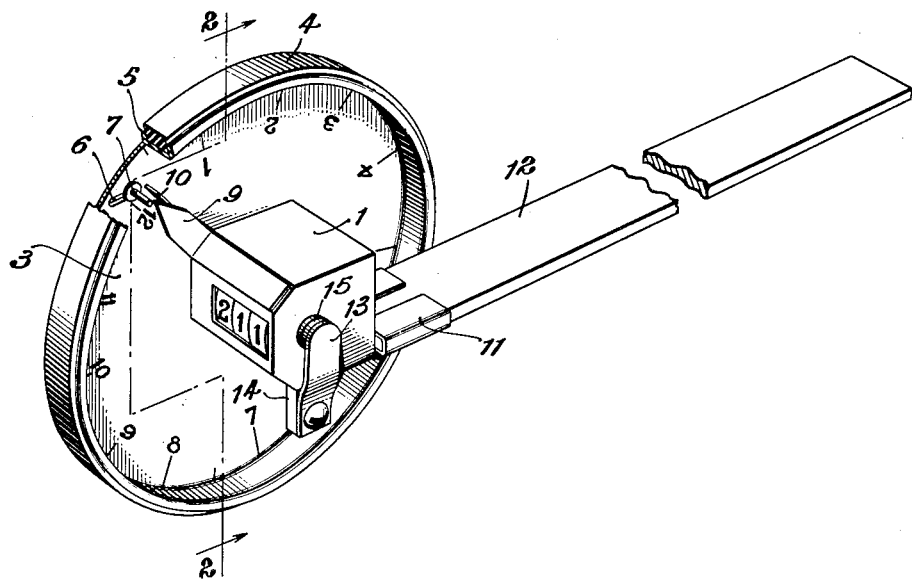
Fig. 1 is a perspective view of the measuring device of the invention.
Figure 2:
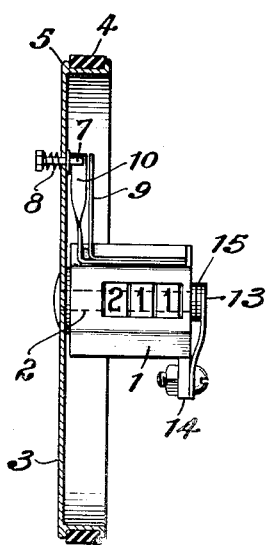
Fig. 2 is a cross-section of the device of Fig. 1 along the lines 2—2.

Referring to the drawing in more detail, the measuring device comprises a counter mechanism 1 of the well known Veeder type illustrated, to whose shaft 2, at one end, is fixedly joined a rotary measuring wheel 3, preferably made of metal. The connection between the wheel 3 and one end of the countershaft 2 takes place in the exact center of the wheel and may be formed by welding, brazing, soldering, or any other suitable process of joining two elements. The counter is thus positioned on the wheel 3 and will be actuated to indicate a unit of measurement each time the wheel 3 completes one revolution. The mechanism of the counter may, if desired, be provided with the customary resetting control (not shown) to provide zero indications on the numbered computing reels thereof, and may be of the type operable in either one or both directions of travel of the wheel 3, as desired.

The measuring wheel 3 is provided with a series of circularly spaced scale marks or gradations indicating inches, or other parts of a desired unit of measurement. It is preferred that the circumference of wheel 3 be one foot in length and there be twelve gradations indicating the inches. In order that the measuring device can operate easily and silently over a floor or other plane surface and at the same time have a surface gripping action, there is provided a circumferentially disposed tire or strip of rubber 4 which fits between the upright edges of rim 5 on the wheel 3. The rotary wheel is also provided with a slot 6 which accommodates a pin 7, the latter being movable by means of pin lock 8 to any desired position along the length of the slot. The purpose of this pin is described later.

Depending from the counter 1 is a stationary pointer or indicator 9 which cooperates with the scale marks or gradations on the wheel 3 to indicate the fractional units of linear measurement (in this case, inches) provided on the side of wheel 3. Inasmuch as the counter 1 indicates only complete revolutions of the wheel 3, it will be necessary to read the fractional units on the wheel to obtain a complete measurement of the distance traversed by the wheel.

Also attached to the counter but located underneath the pointer, in the manner shown, is a stationary flexible metallic spring 10 which is designed to produce an audible sound whenever it engages and is passed by the pin 7. Since the pin 7 engages the spring 10 only once for each revolution of the wheel 3, it will be evident that the operator of the device will hear an audible click for each unit of measurement corresponding to the circumferential distance of the wheel, in this case each foot. Slot 6 enables the pin 7 to be moved, by means of pin-lock 8, out of engaging position with spring 10 whenever it is desired not to use the audible signal.

In order to permit the measuring device to be operated by a person walking or standing in a comfortable position, the counter is provided with a socket 11 for accommodating a handle 12 which can take the form of a folding ruler or other suitable strip of wood or metal. The socket 11 merely consists of a sheet of rigid material, such as metal, folded over at its edges and fixedly attached at one end to the counter. By inserting the handle 12 into the other end of the socket and sliding the handle into the socket, there is provided a sufficiently tight linkage between handle and socket to enable the user to operate the measuring device.

To prevent a completely free movement of the wheel 3 whenever this rotary element is not actually being used for measuring purposes, there is provided a friction brake in the form of a metallic spring 13, one end of which is secured by a screw and bolt arrangement to a stud 14 on the counter and the other end of which frictionally engages the free end of shaft 2, as shown. It is preferred that the end of spring 13, which engages the shaft 2, be provided with a leather or rubber disc 15 glued to the spring and located between the spring 13 and the counter shaft. The tension which the spring 13 exerts upon the shaft 2 is slight but sufficient to prevent the wheel 3 from rotating freely when not being driven over a surface to be measured.

Of course, if a counter is used of the type having a ratchet arrangement therein which of itself provides a slight retarding action for the free rotation of the shaft, then it may not be necessary to employ the friction spring or brake 13.

In the process of obtaining a linear measurement, the free end of pointer 9 is aligned with the twelve inch (equivalent to zero) scale mark on the wheel 3, and the indication on the counter mechanism noted or set to zero. The device is then advanced along the linear surface to be measured. With each foot the counter will indicate another numeral, and an audible sound will be produced by spring 10, if the pin 7 is properly set. If the distance undergoing measurement terminates in a fraction of a foot, such fractional distance may be indicated by noting the position of the numerals on the wheel 3 with respect to the pointer 9.

The measuring device of the invention has the following advantages, among others: The construction lends itself to a simple and inexpensive method of manufacture. The device is of light weight, small and compact, and can be conveniently placed in the pocket of a user by the removal of the handle. And, the audible feature permits a user to make a measurement of the foot distance without the necessity for reading the counter.

What is claimed is:

1. A portable, light-weight, pocket size measuring device including a rotary measuring wheel, a counter having a shaft fixedly joined at one end only to the center of said wheel, a pin extending laterally from said wheel and movable therewith, and a stationary flexible spring secured at one end to said counter and projecting into the path of movement of said pin, whereby rotation of said wheel will cause said pin to engage and pass by said spring and produce an audible indication, said wheel having a series of circularly spaced scale marks, and a stationary pointer secured to said counter and cooperating with the scale marks on said wheel, said spring and pointer being substantially coextensive in length and said spring being located between said pointer and wheel.

2. A portable light weight measuring device including a rotary measuring wheel, a counter having a stationary casing and a rotatable shaft, said shaft being fixedly joined at one end only to the center of said wheel, a friction brake at the other end of said shaft, in the form of a spring secured to said casing, and a handle socket attached to said casing.

3. A portable light weight measuring device including a rotary measuring wheel, a counter having a stationary casing and a rotatable shaft, said shaft being fixedly joined at one end only to the center of said wheel, a friction brake at the other end of said shaft in the form of a spring secured to said casing and exerting pressure in an axial direction at the end of the shaft, and a handle socket attached to said casing.

4. A device in accordance with claim 1, including a slot in said wheel for accommodating said pin, said pin being adjustable in said slot for moving said pin out of engagement with said spring.

5. A portable light weight measuring device including a rotary measuring wheel, a counter having a stationary casing and a rotatable shaft, said shaft being fixedly joined at one end only to the center of said wheel, a friction brake also at one end of the shaft in the form of a spring in contact with the casing and exerting pressure effectively on the shaft, and a handle socket attached to said casing.

FRANK B. HARMON.